United States Patent
Stavens et al.

(10) Patent No.: US 7,718,743 B2
(45) Date of Patent: May 18, 2010

(54) METHODS FOR MONITORING REACTOR PASSIVATION FOR GAS PHASE POLYMERIZATION

(75) Inventors: Kevin B. Stavens, Houston, TX (US); Cynthia A. Mitchell, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 81 days.

(21) Appl. No.: 12/184,681

(22) Filed: Aug. 1, 2008

(65) Prior Publication Data

US 2010/0029865 A1   Feb. 4, 2010

(51) Int. Cl.
*C08F 2/00* (2006.01)
*C08F 2/34* (2006.01)
*B01J 19/24* (2006.01)

(52) U.S. Cl. .............. 526/73; 526/59; 526/61; 526/62; 526/918; 422/131; 374/120

(58) Field of Classification Search .......... 526/59, 526/61, 62, 918, 73; 422/131; 374/120
See application file for complete search history.

(56) References Cited

U.S. PATENT DOCUMENTS

| | | | |
|---|---|---|---|
| 4,532,311 A | 7/1985 | Fulks et al. | |
| 4,792,592 A | 12/1988 | Fulks et al. | |
| 4,876,320 A | 10/1989 | Fulks et al. | |
| 5,571,879 A * | 11/1996 | Jimbo et al. | 526/74 |
| 2003/0027949 A1 * | 2/2003 | Yamamoto et al. | 526/88 |

FOREIGN PATENT DOCUMENTS

| WO | WO 01/66610 | 9/2001 |
|---|---|---|
| WO | WO 2004/029098 | 4/2004 |
| WO | WO 2008/070124 | 6/2008 |
| WO | WO 2008/108931 | 9/2008 |

* cited by examiner

*Primary Examiner*—Fred M Teskin

(57) ABSTRACT

Methods and system for in-situ measurement of polymer growth within an olefin polymerization reactor are provided. The method includes polymerizing one or more olefins within a reactor at a first temperature sufficient to deposit a polymer coating therein. A second temperature is created within the reactor, and a rate of temperature change is measured from the first temperature to the second temperature. The rate of temperature change is correlated to a thickness of the polymer coating deposited within the reactor.

25 Claims, 2 Drawing Sheets

US 7,718,743 B2

METHODS FOR MONITORING REACTOR PASSIVATION FOR GAS PHASE POLYMERIZATION

FIELD OF THE INVENTION

Embodiments of the present invention generally relate to gas phase olefin polymerization. More particularly, embodiments relate to reactor pretreatment for gas phase olefin polymerization.

BACKGROUND OF THE INVENTION

Gas phase polymerization converts a gaseous monomer into granular solids. The gaseous monomer, and optional comonomer, are introduced under pressure into a reaction vessel, i.e. reactor, containing a catalyst and optional activator. Once polymerization begins, the monomer molecules diffuse to the growing polymer chains within the reactor. The resulting polymer is obtained as a granular solid which is fluidized within the reactor with the monomer and catalyst.

Gas phase polymerization is particularly prone to depositing solid particles on the reactor walls and other process exposed surfaces of the reactor due to static charge or electrical attraction between a metal surface and the polymer. Over time, the solids can accumulate and grow to form a solid sheet of polymer on the metal, such as a reactor wall or internal distribution plate, injection nozzle or product discharge nozzle. This phenomenon is common in the art and is known as "sheeting" when the polymer forms on a wall of the reactor, or "plugging" when the polymer forms on the distributor plate or nozzles and blocks the flow of fluid therethrough.

Polymer sheets on the walls of the reactor can grow in height and thickness to the point where the weight of the sheet overcomes any attractive forces between the sheet and the metal and falls to the bottom of the reactor. Solid polymer can also grow to an appreciable thickness to plug or block fluid flow paths on the nozzles or distribution plate. In either case, the solid polymer can plug or block monomer injection, catalyst injection, and/or product discharge. The solid polymer can also inhibit or interfere with fluidization within the reactor. As a result, the polymer product can become off spec and/or polymerization can come to a stop. To remove the solid polymer, the reactor is usually purged and shut down, which is both costly and time-consuming.

Certain pretreatment techniques have been used to prevent or control sheeting or plugging within the reactor. For example, a liquid catalyst has been sprayed onto the walls of the reactor and reacted with the monomer to produce a polymer coating or layer on the reactor wall that serves as an insulation layer to prevent product polymer growth thereon. The liquid catalyst is typically a chromocene. Such technique is described in more detail in U.S. Pat. Nos. 4,532,311, 4,792,592, and 4,876,320.

To be an effective tool for preventing or controlling sheeting or plugging within the reactor, the polymer should be even and consistently distributed throughout the reactor. The reaction time is estimated based on experience; however, due to varying conditions or other interruptions, the polymer growth is often uncertain and unpredictable. Thus, to assess the success of the chromocene treatment, the reactor is typically purged and opened to visually inspect the polymer coating and/or to measure the layer thickness. Often times, to the disappointment of the operator, no coating is found upon inspection and/or the coating is not evenly distributed.

There is a need, therefore, for new apparatus and methods for an on-line, real time detection of the polymer thickness during the chromocene treatment.

SUMMARY OF THE INVENTION

Systems and methods for on-line, real time detection of polymer thickness within a gas phase polymerization are provided. In at least one specific embodiment, one or more olefins are polymerized within the reactor at a first temperature sufficient to deposit a polymer coating therein. A second temperature is created within the reactor and a rate of temperature change is measured from the first temperature to the second temperature. The rate of temperature change is correlated to determine a thickness of the polymer coating deposited within the reactor.

In at least one other specific embodiment, one or more olefins are polymerized, in a gas phase reactor, at a first temperature in the presence of a catalyst system comprising one or more chromocene catalysts to provide a polymer coating therein. One or more process exposed surfaces are treated prior to polymerizing with the catalyst system to reduce or eliminate polymer growth on the treated surface. A second temperature is created within the reactor, and a rate of temperature change is measured from the first temperature to the second temperature. The rate of temperature change is correlated to determine a thickness of the polymer coating deposited within the reactor. Once reaching a desired polymer thickness, the one or more olefins are polymerized, preferably in the presence of a metallocene or Ziegler-Natta catalyst system.

In at least one other specific embodiment, one or more measurement surfaces are located within a polymerization system comprising a reactor. One or more monomers in the presence of a chromocene catalyst are polymerized at conditions sufficient to deposit a polymer coating having a thickness greater than 5 mils on an interior wall of the reactor and the one or more measurement surfaces. A rate of temperature change across the one or more measurement surfaces is measured; and one or more reaction conditions are adjusted within the polymerization system to get a desired polymer coating thickness within the reactor. The reaction conditions can be selected from the group consisting of reactor temperature, reactor pressure, olefin feed rate, olefin temperature, and chromocene feed rate.

In at least one specific embodiment, the system includes a gas phase reactor for polymerizing one or more olefins at a first temperature and pressure sufficient to deposit a polymer coating therein; one or more thermally conductive devices at least partially disposed within the reactor, each thermally conductive device comprising a measurement surface, power source and recorder; means for heating or cooling the measurement surface to a second temperature, wherein the second temperature is above or below the first temperature; and means for measuring a rate of temperature change of the measurement surface.

Specifically, the temperature change within the reactor may be created by heating or cooling a thermally conductive device at least partially disposed in the reactor to a second temperature above or below the first temperature.

DETAILED DESCRIPTION

Figure 1:
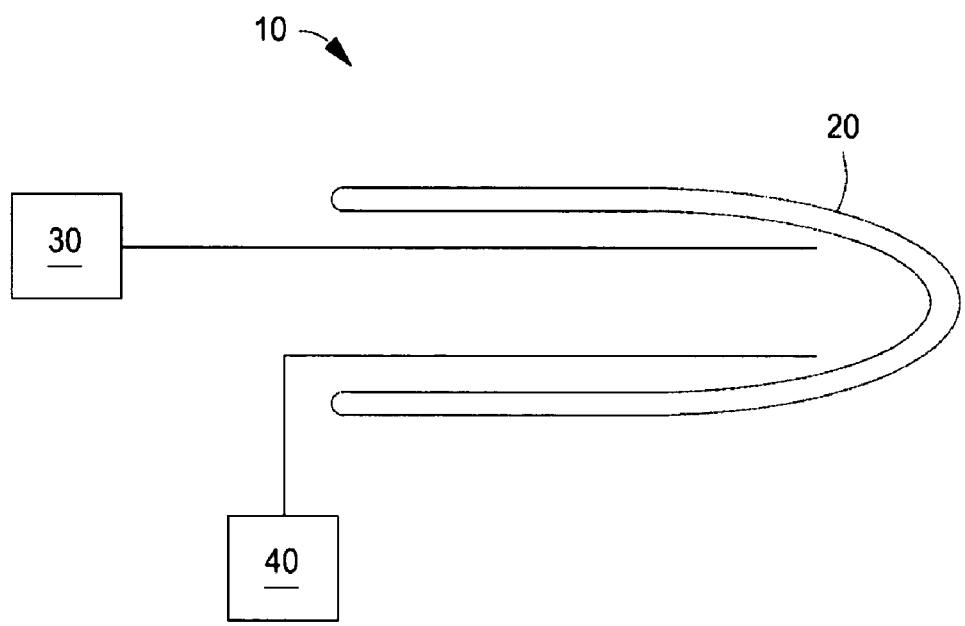
FIG. 1 depicts a schematic of an illustrative thermal detection device, according to one or more embodiments.

A detailed description will now be provided. FIG. 1 depicts a schematic of an illustrative thermal detection device, according to one or more embodiments. The thermal detection device 10 can include a measurement surface 20, a heating/cooling source 30, and a recorder 40. The measurement surface 20 can be constructed of or coated with the same material as the reactor wall, e.g. A516 grade 70 stainless steel so that polymer growth measured on the measurement surface 20 would be indicative of the polymer growth within the reactor.

The measurement surface 20 can be any shape or size. In one or more embodiments, the measurement surface 20 can be an elongated member, resembling a probe, as depicted in FIG. 1. The measurement surface 20 can have a length to diameter ratio of at least 2:1, more preferably at least 5:1 and more preferably at least 10:1. The length of the measurement surface 20 can be at least 1 cm, 5 cm, 10 cm, or 100 cm. In one or more embodiments, the length can range from about 1 cm, 3 cm, or 5 cm to about 10 cm, 20 cm, or 50 cm. The diameter of the measurement surface 20 can be at least 0.01 cm, at least 0.03 cm, at least 1 cm, at least 1.5 cm, at least 2.5 cm, or at least 5 cm.

Although not shown in FIG. 1, the measurement surface 20 can be an elongated member with a rectangular or square shaped cross section profile to provide additional surface area. As such, the measurement surface 20 can have a length to width ratio of at least 2:1, more preferably at least 5:1 and more preferably at least 10:1. The length of the measurement surface 20 can be at least 1 cm, 5 cm, 10 cm, or 100 cm. In one or more embodiments, the length can range from about 1 cm, 3 cm, or 5 cm to about 10 cm, 20 cm, or 50 cm. The width of the measurement surface 20 can be at least 0.01 cm, at least 0.03 cm, at least 1 cm, at least 1.5 cm, at least 2.5 cm, or at least 5 cm. The height of the measurement surface 20 can be at least 0.01 cm, at least 0.03 cm, at least 1 cm, at least 1.5 cm, at least 2.5 cm, or at least 5 cm.

In one or more embodiments, the measurement surface 20 can be a plate or disc shaped member. As such, the measurement surface 20 can have a diameter of at least 2.5 cm, 25 cm, 250 cm or 500 cm, and a thickness of at least 0.5 cm, 1 cm, 2 cm, or 5 cm. The diameter to thickness ratio can range from about 2:1 to 20:1, preferable about 5:1 or 10:1.

Although not shown, the thermal measurement device 10 can include an electrical conductor, such as a pair of electrically conductive wires, to communicate between the heating/cooling source 30 and the measurement surface 20. The heating/cooling source 30 can be any system or device capable of producing a temperature difference across the measurement surface 20. The heating/cooling source 30 can also be any system or device capable of producing an electrical potential across the measurement surface 20. For example, the heating/cooling source 30 can be one or more DC batteries, fuel cells, solar cells or a typical 120 or 240 volt AC power outlet.

The recorder 40 can be any system or device suitable for recording a temperature at the measurement surface 20. For example, the recorder 40 can be a standard analog or digital voltmeter. The readout or measurements from the recorder 40 can be collected online and near instantaneously. The measurements can then be directly correlated with the polymer thickness that developed on the measurement surface 20, as discussed above.

In operation, a temperature difference, voltage and/or electrical potential can be applied to the measurement surface 20 for a short period of time to increase its temperature to a predetermined temperature that is higher than reactor wall or reaction zone. The applied voltage and/or temperature can be constant, continuous, interrupted or modulated in any fashion. The heat and/or potential would then be removed and the rate of temperature change of the measurement surface 20 would be recorded with time, i.e. temperature "decay rate." After the initial applied heat and/or voltage, the temperature of the thermal detection device 10 would be expected to decrease with the decay constant (t) that is a function of the thermal detection device 10 set-up along with the amount of polymer coating that developed on the measurement surface 20.

The predetermined temperature can be at least 5° C., 10° C., 20° C., 25° C., 30° C., or 40° C. above the reactor wall or reaction zone temperature. In one or more embodiments, the predetermined temperature ranges from about 5° C., 10° C. or 13° C. to about 17° C., or 27° C. higher than the reactor wall or reaction zone temperature. In one or more embodiments, the predetermined temperature is about 80° C. to about 125° C. In one or more embodiments, the predetermined temperature is about 85° C. to about 120° C.; or 85° C. to about 115° C.; or 85° C. to about 110° C.; or 90° C. to about 105° C.

The measured decay constant (t) could then be used to determine the amount of polymer coating on the measurement surface 20. The decay constant (t) is a function of the overall heat transfer coefficient, surface area, heat capacity and mass of the measurement surface 20. Since the surface area, mass and heat capacity of the measurement surface 20 are constant, any changes in decay constant would be attributed to changes in the overall heat transfer coefficient. Since the process conditions and the measurement surface 20 would remain the same, i.e. constant or substantially constant, a change in the overall heat transfer coefficient is indicative of the build-up of polymer on the measurement surface 20. The decay rate decreases with buildup of the insulating polymer layer; thus, monitoring how the decay rate changes with time would indicate how the polymer coating changed with time.

Measurements could be repeated as needed at appropriate time intervals and, each time, the measured decay constant (t) could be used to determine the amount of polymer that had developed on the measurement surface 20. Measurements could be taken on a time scale of seconds or minutes and could be easily repeated as needed throughout polymer growth. For example, measurements could be taken every second, 15 seconds, 30 seconds, 60 seconds, 2 minutes, 5 minutes, 15 minutes, 30 minutes, 45 minutes, or every hour.

Preferably, the coating thickness is at least 5 mils. In one or more embodiments, the polymer thickness ranges from about 5 mils to about 100 mils. In one or more embodiments, the polymer thickness ranges from about 5 mils to about 20 mils. In one or more embodiments, the polymer thickness ranges from a low of about 2 mils, 5 mils, or 10 mils to high of about 15 mils, 20 mils, or 50 mils.

Figure 2:
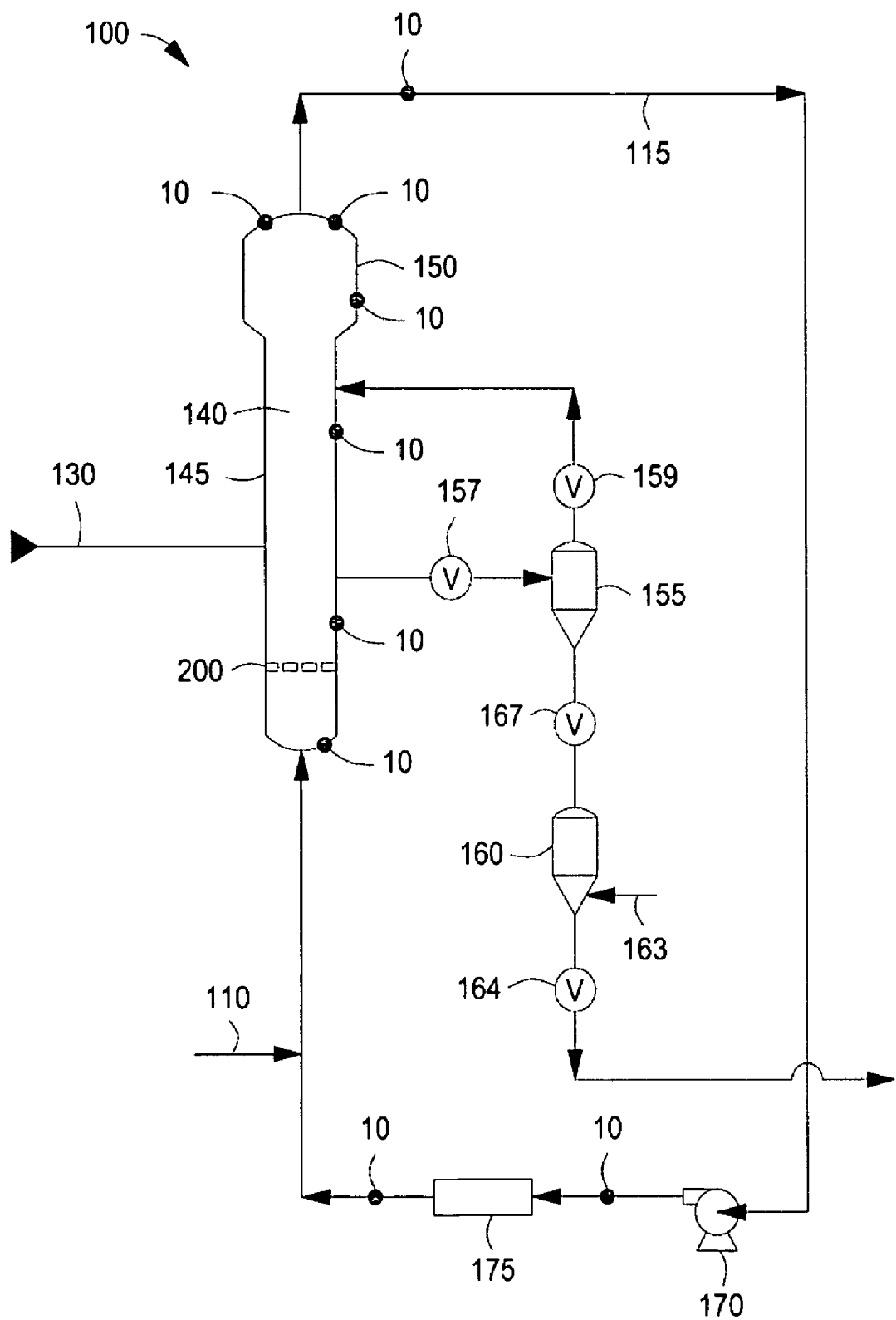
FIG. 2 depicts an illustrative gas phase system for producing polyolefin, according to one or more embodiments.

FIG. 2 depicts an illustrative gas phase system 100 for making polyolefin, according to one or more embodiments. As depicted, the system 100 can include a reactor 140 having an input 130, said reactor 140 in fluid communication with one or more discharge tanks 155 (only one shown), surge tanks 160 (only one shown), recycle compressors 170 (only one shown), and heat exchangers 175 (only one shown). The polymerization system 100 can also include more than one reactor 140 arranged in series, parallel, or configured independent from the other reactors, each reactor having its own associated tanks 155, 160, compressors 170, and heat exchangers 175 or alternatively, sharing any one or more of the associated tanks 155, 160, compressors 170, and heat exchangers 175. For simplicity and ease of description, embodiments of the invention will be further described in the context of a single reactor train.

In one or more embodiments, the reactor 140 can include a reaction zone 145 in fluid communication with a velocity reduction zone 150. The reaction zone 145 can include a bed of growing polymer particles, formed polymer particles and catalyst particles fluidized by the continuous flow of polymerizable and modifying gaseous components in the form of make-up feed and recycle fluid through the reaction zone 145.

A feed stream or make-up stream 110 can be introduced into the polymerization system at any point. For example, the feed stream or make-up stream 110 can be introduced to the reactor fluid bed in the reaction zone 145 or to the expanded section 150 or to any point within the recycle stream 115. Preferably, the feed stream or make-up stream 110 is introduced to the recycle stream 115 before or after the heat exchanger 175. In FIG. 1, the feed stream or make-up stream 110 is depicted entering the recycle stream 115 after the cooler 175.

The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, butene, pentene, 4-methyl-1-pentene, hexene, octene, decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle (not shown in the drawing) into the bed. The feed stream can further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 145, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

The velocity reduction zone 150 has a larger inner diameter than the reaction zone 145. As the name suggests, the velocity reduction zone 150 slows the velocity of the gas due to the increased cross sectional area. This reduction in gas velocity allows particles entrained in the upward moving gas to fall back into the bed, allowing primarily only gas to exit overhead of the reactor 140 through recycle gas stream 115.

The recycle stream 115 can be compressed in the compressor(s) 170 and then passed through the heat exchanger 175 where heat is removed before it is returned to the bed. The heat exchanger 175 can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream 115 is returned to the reactor 140. The cooled recycle stream absorbs the heat of reaction generated by the polymerization reaction. Condensing mode operation such as disclosed in U.S. Pat. Nos. 4,543,399 and 4,588,790 can also be used to assist in heat removal from the reactor 140.

Preferably, the recycle stream 115 is returned to the reactor 140 and to the fluidized bed through a gas distribution plate 200. The gas distribution plate 200 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa.

One or more measurement surfaces 20 can be located on or about an interior surface of the reactor 140. The measurement surface 20 can be arranged in any pattern and/or frequency about the reaction zone, velocity reduction zone, or dome. One or more measurement surfaces 20 can also located upstream and/or downstream of the compressors 170, and/or heat exchangers 175.

Preferably, the thermal detection devices 10 are mounted or otherwise disposed within the system 100 in a manner that the device 10 can be easily removed without interrupting operations within the system 100. For example, one or more thermal detection devices 10 can be mounted or otherwise disposed within one or more injection or discharge nozzles, thermo wells, and/or other process analyzer ports or connectors. The thermal detection devices 10 can also be mounted or otherwise disposed within the system 100 such that the measurement surfaces 20 are located on or adjacent the surface to be treated or coated.

During the chromocene treatment, all or part of the polymerization system 100 can be treated with a chromium-containing catalyst ("chromium catalyst" or "chromium catalyst system") to polymerize one or more olefins at gas phase conditions to deposit a layer of the polymer ("polymer coating") therein. The chromium catalyst can be injected, sprayed or otherwise introduced into the reactor 140 as a solution or suspension so that the chromium catalyst can deposit on one or more process exposed surfaces and be supported thereon. In one or more embodiments, the deposited chromium catalyst can be "oxidized" by injecting oxygen into the reactor before introducing a cocatalyst and one or more olefins to form the polymer coating. The cocatalyst can be an alkyl aluminum compound, such as triethylaluminum (TEAL).

The chromium-containing catalyst can be or include one or more chromium-containing catalysts ("CCC"), and can be a solution or liquid. The solution CCC can include silyl chromate. The liquid CCC can be or include one or more metallocenes represented by the following structure:

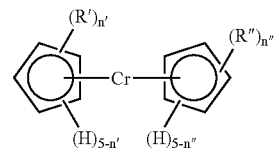

wherein R' and R" are each independently selected from the group consisting of C1 to C20 alkyl;

n' is an integer 0 to 5;

n" is an integer 0 to 5; and

R' and R" are each independently selected from the group consisting of saturated or unsaturated hydrocarbyl groups and saturated or unsaturated substituted hydrocarbyl groups (preferably saturated or unsaturated-aliphatic, -alicyclic, and -aryl hydrocarbyl groups and saturated or unsaturated heteroaryl substituted hydrocarbyl groups). Preferably each R' and R' is, independently, a saturated or unsaturated hydrocarbyl group (such as alkyl, heteroalkyl, aryl and heteroaryl).

The term "gas phase conditions" as used herein refers to temperatures and pressures suitable for polymerizing one or more gaseous phase olefins to produce polymer therefrom. The conditions for gas phase polymerization can vary depending upon the olefins to be polymerized, catalysts, and catalyst systems. The specific conditions are known or readily derivable by those skilled in the art. For example, temperature can range of from about −10° C. to about 120° C., often about 15° C. to about 110° C., and pressure can range of from about 0.1 bar to about 100 bar, such as about 5 bar to about 50 bar, for example. Additional details of suitable gas phase polymerization conditions can be found in U.S. Pat. No. 6,627,713.

The polymer coating can have low porosity and low permeability or high porosity and high permeability. In one or more embodiments, the polymer coating is a higher molecular weight polymer (e.g. weight average molecular weight (Mw) of at least 200,000) having a thickness that is permeable to the subsequent reactants (i.e. commercial catalyst and monomer) for polymerizing the commercial product. For example, the polymer coating can have a thickness less than 10 mils (0.24 mm) or less than 5 mils (0.12 mm).

Prior to chromocene treatment, the process exposed surfaces of the system 100 that are prone to blocking or plugging due to the polymer growth can be passivated or otherwise treated so that the polymer coating will not adhere or attach thereto. This passivation step can convert the process exposed surfaces to a non-reactive surface, preventing the chromium-containing catalyst from reacting therewith, and thus, reducing or eliminating the formation of a highly active polymerization catalyst that can grow polymer.

The term "process exposed surface" as used herein, refers to any metallic surface within the system 100 that can contact active catalyst and monomer. A process exposed surface can include, but is not limited to the inner surfaces of the side walls, inner surface of the dome, injection nozzles, injection tubes, compressors, heat exchanger, process piping, instrumentations, man ways, and distribution plates. Not wishing to be bound by theory, it is believed that those process exposed surfaces of the reactor are made of carbon steel or iron, which have a tendency to oxidize and rust over time, especially when the reactor is opened to the atmosphere for maintenance and/or cleaning. Such oxidation on the process exposed surfaces provides higher surface area and increased amounts of metal oxide and hydroxyl groups that can react with the chromium-containing catalyst to form a highly active chemisorbed polymerization catalyst. Such oxidation on the process exposed surfaces also provides a rough surface that serves as a support for the chromium-containing catalyst system allowing the catalyst to reside thereon.

In one or more embodiments, the passivation step can include depositing or otherwise applying a process inert material or layer of material on at least a portion of the process exposed surface to be protected. In one or more embodiments, a corrosion inhibiting layer can be applied to at least a portion of the one or more process exposed surfaces. The corrosion inhibiting layer can include one or more refractory (i.e. non-reactive) materials. For example, the corrosion inhibiting layer can include one or more non-iron metals and/or non-iron metal alloys. The corrosion inhibiting layer can include one or more ceramics and/or silicas. Preferably, the refractory material can self-passivate. For example, the corrosion inhibiting layer can include zinc which can be oxidized to form a thin surface layer of zinc oxide. The zinc oxide provides a protective layer on the surface to be protected so that it passivates the underlying surface against further oxidation.

In one or more embodiments, a process exposed surface can be polished or smoothed to prevent the polymer from sticking thereto. Polished iron and steel surfaces tend to oxidize less rapidly than gritblasted steel surfaces, thus polished steel surfaces can also present lower levels of oxidation for a given amount of air-moisture exposure. Surface oxidation can lead to an active catalyst subsequently depositing thereon, and thus more polymer formation on this surface, leading to fouling. Hence, polished or smoothed surfaces tend to result in lower amounts of surface oxidation and consequently lower fouling.

In one or more embodiments, the passivation step can include applying a low adhesion coating on at least a portion of the process exposed surface to be protected. The low adhesion coating or layer can include one or more materials having a stronger or better adhesion to the coating polymer than the underlying metal oxide(s). Illustrative materials can include a thin polyethylene film such as polytetrafluoroethylene (PTFE) or commercially known as Teflon®, oil, and/or a non-volatile hydrocarbon-containing compound. Suitable non-volatile, hydrocarbon-containing compounds can include a halogen substituted or a silicon-containing hydrocarbon grease.

In at least one specific embodiment, the low adhesion coating can be applied on top of the corrosion inhibiting layer and/or on the smoothed/polished surface. In the event the chromium-containing catalyst did collect on the low adhesion coating layer on either the corrosion inhibiting layer or smoothed internal and produce polymer, the low adhesion layer would allow for easy cleaning because the low adhesion material having the polymer coating thereon can be easily separated or otherwise removed from the underlying coating or process exposed surface.

Upon reaching the desired thickness of polymer coating with the chromocene treatment, reaction conditions can be changed in the reactor 140 and another catalyst system ("product catalyst system") can be introduced to polymerize one or more olefins to provide a product polymer ("commercial product"). The one or more olefins (i.e. monomers) to provide the product polymer can be same as the one or more olefins for polymerizing the polymer coating. Examples of suitable olefins include ethylene, propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1, 3-methyl-pentene-1, 3,5,5-trimethyl hexene-1. Preferably, the olefin is or includes ethylene. In one or more embodiments, the olefin is or includes propylene. A comonomer is optional and can be selected from butene, hexene, octene, and combinations thereof. Comonomers are typically present at up to 50 mole %, preferably at from 0.5 to 30 mole %, preferably 1 to 20 mole %.

The product catalyst system can include Ziegler-Natta catalysts, chromium-based catalysts, metallocene catalysts and other single-site catalysts including Group 15-containing catalysts, bimetallic catalysts, and mixed catalysts. The catalyst system can also include $AlCl_3$, cobalt, iron, palladium, chromium/chromium oxide or "Phillips" catalysts. Any catalyst can be used alone or in combination with the others. In one or more embodiments, a "mixed" catalyst is preferred.

The term "catalyst system" includes at least one "catalyst component" and at least one "activator", alternately at least one cocatalyst. The catalyst system can also include other components, such as supports, and is not limited to the catalyst component and/or activator alone or in combination. The catalyst system can include any number of catalyst components in any combination as described, as well as any activator in any combination as described.

The term "catalyst component" includes any compound that, once appropriately activated, capable of catalyzing the polymerization or oligomerization of olefins. Preferably, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

As used herein, in reference to Periodic Table "Groups" of Elements, the "new" numbering scheme for the Periodic Table Groups are used as in the CRC Handbook of Chemistry and Physics (David R. Lide, ed., CRC Press 81$^{st}$ ed. 2000).

The term "substituted" means that the group following that term possesses at least one moiety in place of one or more hydrogen atoms in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, C1 to C10 alkyl groups, C2 to C10 alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Suitable chromium catalysts can include di-substituted chromates, such as $CrO_2(OR)_2$; where R is triphenylsilane or a tertiary polyalicyclic alkyl. The chromium catalyst system may further include $CrO3$, chromocene, silyl chromate, chromyl chloride ($CrO_2Cl_2$), chromium-2-ethyl-hexanoate, chromium acetylacetonate ($Cr(AcAc)_3$), and the like.

Metallocenes are generally described throughout in, for example, 1 & 2 Metallocene-Based Polyolefins (John Scheirs & W. Kaminsky, eds., John Wiley & Sons, Ltd. 2000); G. G. Hlatky in 181 Coordination Chem. Rev. 243-296 (1999) and in particular, for use in the synthesis of polyethylene in 1 Metallocene-Based Polyolefins 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to at least one metal atom. Hereinafter, these compounds will be referred to as "metallocenes" or "metallocene catalyst components". The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno [1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. No. 5,318,935: U.S. Pat. No. 5,889,128; U.S. Pat. No. 6,333,389 B2; and U.S. Pat. No. 6,271,325 B1. In one embodiment, the Group 15-containing catalyst includes a Group 4 imino-phenol complexes, Group 4 bis(amide) complexes, and Group 4 pyridyl-amide complexes that are active towards olefin polymerization to any extent.

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes described. Illustrative Lewis acids include, but are not limited to, alumoxane (e.g., "MAO"), modified alumoxane (e.g., "TIBAO"), and alkylaluminum compounds. Ionizing activators (neutral or ionic) such as tri(n-butyl)ammonium tetrakis (pentafluorophenyl)boron may be also be used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) Chemical Reviews 1391-1434 (2000). The activators may be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) Chemical Reviews 1347-1374 (2000).

Illustrative Ziegler-Natta catalyst compounds are disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415; and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: MRx, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3 AlCl_3$ and $Ti(OCl_2H_{25}Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M^3M^4{}_vX^2{}_cR^3{}_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB, or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

The mixed catalyst can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred embodiment, the mixed catalyst includes at least one metallocene catalyst component and at least one non-metallocene component.

Referring again to FIG. 2, the product catalyst or product catalyst system can be introduced to the fluidized bed within the reactor 140. The product catalyst or product catalyst system can be introduced as pre-formed particles in one or more liquid carriers (i.e., a catalyst slurry). Suitable liquid carriers include mineral oil and liquid hydrocarbons including but not limited to propane, butane, isopentane, hexane, heptane and octane, or mixtures thereof. A gas that is inert to the catalyst slurry such as, for example, nitrogen or argon can also be used to carry the catalyst slurry into the reactor 140. In one or more embodiments, the product catalyst or product catalyst system can be a dry powder. In one or more embodiments, the product catalyst or product catalyst system can be dissolved in the liquid carrier and introduced to the reactor 140 as a solution.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

The conditions for polymerizations vary depending upon the monomers, catalysts, catalyst systems, and equipment availability. The specific conditions are known or readily derivable by those skilled in the art. For example, the temperatures are within the range of from about −10° C. to about 120° C., often about 15° C. to about 110° C. Pressures are within the range of from about 0.1 bar to about 100 bar, such as about 5 bar to about 50 bar, for example. Additional details of polymerization can be found in U.S. Pat. No. 6,627,713, which is incorporated by reference at least to the extent it discloses polymerization details.

On discharge of polymer product from reactor 140, it is desirable and preferable to separate fluid from the product and to return the fluid to the reactor 140. In one or more embodiments, this separation is accomplished when fluid and product leave the reactor 140 and enter the product discharge tanks 155 (one is shown) through valve 157, which can be a ball valve designed to have minimum restriction to flow when opened. Positioned above and below the product discharge tank 155 are conventional valves 159, 167. The valve 167 allows passage of product into the product surge tanks 160 (only one is shown).

In at least one embodiment, to discharge particulate polymer from reactor 140, valve 157 is opened while valves 159, 167 are in a closed position. Product and fluid enter the product discharge tank 155. Valve 157 is closed and the product is allowed to settle in the product discharge tank 155. Valve 159 is then opened permitting fluid to flow from the product discharge tank 155 to the reactor 145. Valve 159 is then closed and valve 167 is opened and any product in the product discharge tank 155 flows into the product surge tank 160. Valve 167 is then closed. Product is then discharged from the product surge tank 160 through valve 164. The product can be further purged via purge stream 163 to remove residual hydrocarbons and conveyed to a pelletizing system or to storage (not shown). The particular timing sequence of the valves 157, 159, 167, 164 is accomplished by the use of conventional programmable controllers which are well known in the art.

Another preferred product discharge system which can be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

In another embodiment, this invention relates to:

1. A method for in-situ measurement of polymer growth within an olefin polymerization reactor, comprising:
   polymerizing one or more olefins within the reactor at a first temperature sufficient to deposit a polymer coating within the reactor (preferably on a measuring device therein);
   creating a second temperature within the reactor,
   measuring a rate of temperature change from the first temperature to the second temperature; and
   correlating the rate of temperature change to a thickness of the polymer coating deposited within the reactor.
2. The method of paragraph 1, wherein the second temperature is above or below the first temperature.
3. The method of paragraph 2, wherein the first and second temperatures differ by at least 10° C.
4. The method of paragraph 2, wherein the first and second temperatures differ by at least 15° C., preferably at least 25° C.
5. The method of paragraph 1, 2, 3 or 4, wherein the one or more olefins are polymerized in the presence of a catalyst system comprising silyl chromate.
6. The method of any of paragraphs 1 to 5, wherein creating a second temperature within the reactor comprises heating or cooling (preferably heating) a thermally conductive device at least partially disposed in the reactor to a second temperature above or below (preferably above) the first temperature to create a temperature difference.
7. The method of paragraphs 1 to 6, wherein the one or more olefins are polymerized in the presence of a catalyst system comprising one or more chromocenes represented by the general structure:

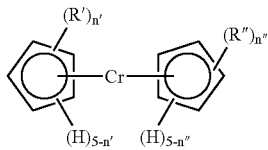

wherein R' and R" are each independently selected from the group consisting of $C_1$ to $C_{20}$ alkyl;
   n' is an integer 0 to 5;
   n" is an integer 0 to 5; and
   R' and R" are each independently selected from the group consisting of saturated or unsaturated hydrocarbyl groups and saturated or unsaturated substituted hydrocarbyl groups (preferably saturated or unsaturated-aliphatic, -alicyclic, and -aryl hydrocarbyl groups and saturated or unsaturated heteroaryl substituted hydrocarbyl groups).
8. The method of paragraphs 1 to 7, wherein the one or more olefins are polymerized in the presence of a catalyst system comprising a chromocene dissolved or suspended in toluene or hexane, and the one or more olefins are polymerized in the presence of one or more alkyl aluminum compounds.
9. The method of paragraphs 1 to 8, wherein the one or more olefins comprises an olefinic hydrocarbon having two to eight carbon atoms.
10. The method of paragraphs 1 to 9, wherein the one or more olefins comprises ethylene.
11. The method of paragraphs 1 to 10, wherein the one or more olefins comprises propylene.
12. The method of 10, wherein the one or more olefins comprises ethylene and either butene, hexene, octene, or a combination thereof.
13. The method of paragraphs 1 to 12, wherein the one or more olefins are polymerized in the presence of a metallocene or Ziegler-Natta catalyst system.
14. A method for olefin polymerization, comprising:
    polymerizing, in a gas phase reactor, one or more olefins at a first temperature in the presence of a catalyst system comprising one or more chromocene catalysts to provide a deposit a polymer coating within the reactor (preferably on a measuring device therein);
    treating one or more process exposed surfaces prior to polymerizing with the catalyst system to reduce or eliminate polymer growth on the treated surface;
    creating a second temperature within the reactor,
    measuring a rate of temperature change from the first temperature to the second temperature;
    correlating the rate of temperature change to a thickness of the polymer coating deposited within the reactor; and
    upon reaching a desired coating thickness, polymerizing the one or more olefins in the presence of a metallocene or Ziegler-Natta catalyst system.
15. The method of paragraph 14, wherein treating comprises coating at least a portion of the one or more process exposed surfaces with a metal containing coating or passivating polymer.
16. The method of paragraph 14 or 15, wherein treating comprises applying a hydrocarbon-containing compound to at least a portion of the one or more process exposed surfaces to enable cohesive failure between the polymer coating and the treated surface, wherein the hydrocarbon-containing compound is non-volatile at the gas phase conditions.
17. The method of paragraph 14, 15 or 16, wherein the hydrocarbon-containing compound consists essentially of a halogen substituted or a silicon-containing hydrocarbon.
18. The method of any of paragraphs 14 to 17, wherein the second temperature is above or below the first temperature.
19. The method of paragraph 18, wherein the first and second temperatures differ by at least 10° C.
20. The method of any of paragraphs 14 to 19, wherein creating a second temperature within the reactor comprises heating or cooling a thermally conductive device at least partially disposed in the reactor to a second temperature above or below the first temperature to create a temperature difference.
21. The method of any of paragraphs 14 to 20, wherein the one or more olefins comprises an olefinic hydrocarbon having two to eight carbon atoms.
22. The method of any of paragraphs 14 to 21, wherein the one or more olefins comprises ethylene and either butene, hexene, octene, or a combination thereof.

23. The method of any of paragraphs 14 to 22, wherein the one or more chromocene catalysts are represented by the general structure:

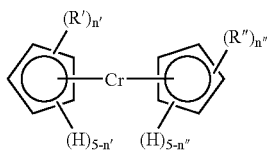

wherein R' and R" are each independently selected from the group consisting of $C_1$ to $C_{20}$ alkyl;
n' is an integer 0 to 5;
n" is an integer 0 to 5; and
R' and R" are each independently selected from the group consisting of saturated or unsaturated hydrocarbyl groups and saturated or unsaturated substituted hydrocarbyl groups (preferably saturated or unsaturated-aliphatic, -alicyclic, and -aryl hydrocarbyl groups and saturated or unsaturated heteroaryl substituted hydrocarbyl groups).

24. A system for gas phase olefin polymerization, comprising:
a gas phase reactor for polymerizing one or more olefins at a first temperature and pressure sufficient to deposit a polymer coating on a measuring device therein;
one or more thermally conductive devices at least partially disposed within the reactor, each thermally conductive device comprising a measurement surface, power source and recorder;
means for heating or cooling the measurement surface to a second temperature, wherein the second temperature is above or below the first temperature; and
means for measuring a rate of temperature change of the measurement surface.

25. The system of paragraph 24, wherein the measurement surface is constructed of a metallic material the same as the reactor.

26. A method for pretreating an interior wall of a polymerization reactor, comprising:
locating one or more measurement surfaces within a polymerization system, the system comprising at least one reaction zone;
polymerizing one or more monomers in the presence of a chromocene catalyst at conditions sufficient to deposit a polymer coating having a thickness great than 5 mils on an interior wall of the reaction zone and the one or more measurement surfaces;
measuring a rate of temperature change across the one or more measurement surfaces; and
adjusting one or more reaction conditions within the system to obtain a desired polymer coating thickness within the reaction zone, the reaction conditions selected from the group consisting of temperature, pressure, olefin feed rate, olefin feed temperature, and chromocene feed rate.

27. The method of paragraph 26, wherein the reaction conditions are selected from the group consisting of temperature, pressure, olefin feed rate, olefin feed temperature, chromocene feed rate, cocatalyst feed rate, and residence time.

28. The method of paragraph 26 or 27, wherein the cocatalyst comprises triethylaluminum.

EXAMPLES

The foregoing discussion can be further described with reference to the following non-limiting examples. Two examples are provided; one using a bare metal plate and one having 13 mils of a high density polyethylene coated on the metal plate. In both examples, the metal plate was a carbon steel plate (A516 grade 70 carbon steel) of dimensions 4"×4"×¼". A ceramic top stir plate was fitted with heating tape for insulation. A jacket made of heating tape was also fitted around the plate for insulation. The cartridge heater (120V Omegalux® CS series cartridge heater, ⅛" in diameter, purchased from Omega) and a thermocouple, also purchased from Omega, were passed through the heating tape into two wells drilled into the plate. Holes were drilled such that there was a good, snug fit for the cartridge heater providing maximum heat transfer.

In the second example, the high density polyethylene coating was a polyethylene powder (ExxonMobil grade HD™ 7960, a high molecular weight, high density polyethylene (0.952 g/cm$^3$)) that was melt pressed onto the plate using a Carver press. The thickness of the polymer on the plate was determined by a commercially available thickness meter, the DeFelsko Positector 6000, operating on the principle of eddy currents. The thickness reported was an average of twenty measurements taken over the plate. For the experimental data reported here, the thickness was 13 mils±4 mils. The plate was then heated to about 25° C. above $T_0$. Heating was stopped and the temperature of the plate was recorded with time until the temperature returned to $T_0$. Table 1 summarizes those recorded temperature and times of the plates.

TABLE 1

| Bare Plate | | | Polymer Coated Plate | | |
|---|---|---|---|---|---|
| Time (min) | Temp (° C.) | Dim T | Time (min) | Temp (° C.) | Dim T |
| 0 | 111 | 1 | 0 | 111 | 1 |
| 10 | 71 | 0.535 | 10 | 84 | 0.69 |
| 20 | 51 | 0.302 | 20 | 66 | 0.48 |
| 30 | 39 | 0.163 | 30 | 51 | 0.30 |
| 50 | 29 | 0.047 | 40 | 42 | 0.20 |
| 60 | 26 | 0.012 | 50 | 36 | 0.13 |
| 66.6 | 25 | 0 | 60 | 32 | 0.08 |
| | | | 70 | 29 | 0.05 |
| | | | 80 | 28 | 0.03 |
| | | | 104.4 | 25 | 0 |

Dim T is a calculated dimensionless temperature, $$\frac{(T(t) - T_E)}{(T_0 - T_E)},$$

as a function of time for the bare plate of A16 Grade 570 carbon steel and one coated with about 13 mils of polymer, where T(t) is the temperature measured at any time t; $T_0$ is the temperature when the applied voltage is removed; and $T_E$ is the temperature at the end condition, which can represent the process condition.

Figure 3:
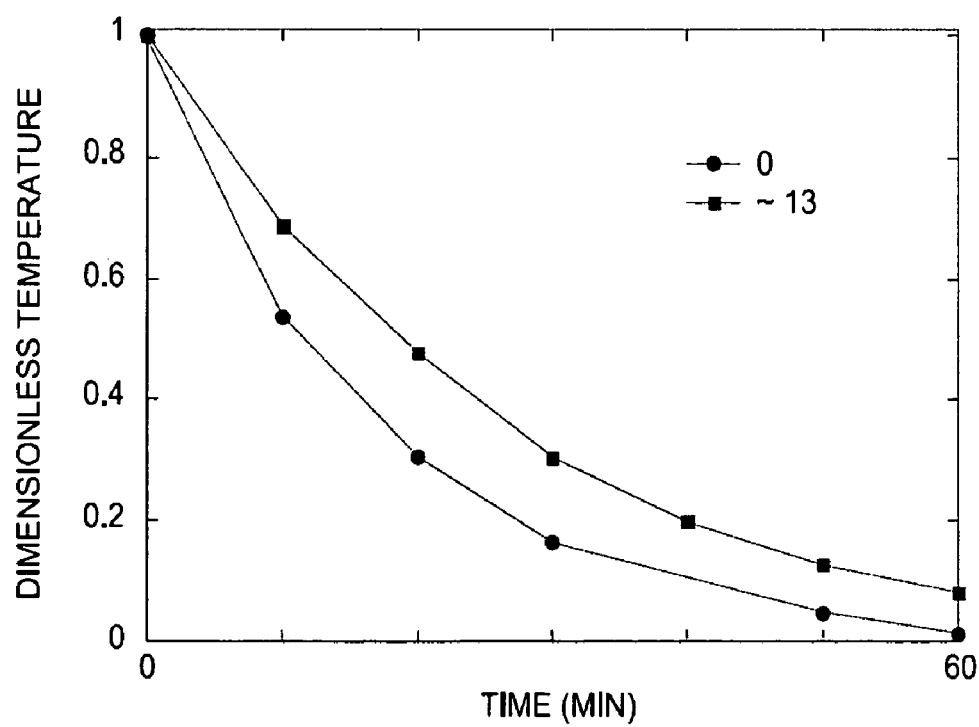
FIG. 3 depicts and illustrative decay curves of a bare metal plate and a plate coated with 13 mils of polymer, according to one or more embodiments.

FIG. 3 illustrates the difference in decay curves between the bare metal plate and the plate coated with 13 mils of polymer. As shown in FIG. 3, the decay rate decreased with the buildup of polymer on the surface of the device. As such, an empirical relationship can be developed between the measured τ and the polymer on the device. Monitoring how τ changes with time in the reactor will indicate how the polymer coating builds as a function of time.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A method for in-situ measurement of polymer growth within an olefin polymerization reactor, comprising:
   polymerizing one or more olefins within the reactor at a first temperature sufficient to deposit a polymer coating within the reactor;
   creating a second temperature within the reactor,
   measuring a rate of temperature change from the first temperature to the second temperature; and
   correlating the rate of temperature change to a thickness of the polymer coating deposited within the reactor.

2. The method of claim 1, wherein the polymer coating is deposited on a measurement surface.

3. The method of claim 2, wherein the first and second temperatures differ by at least 10° C.

4. The method of claim 1, wherein creating a second temperature within the reactor comprises heating a thermally conductive device at least partially disposed in the reactor to a second temperature above the first temperature to create a temperature difference.

5. The method of claim 1, wherein the one or more olefins are polymerized in the presence of a catalyst system comprising one or more chromocenes represented by the general structure:

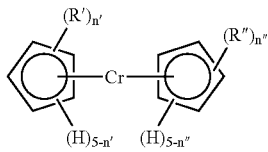

wherein R' and R" are each independently selected from the group consisting of $C_1$ to $C_{20}$ alkyl;
n' is an integer 0 to 5;
n" is an integer 0 to 5; and
R' and R" are each independently selected from the group consisting of saturated or unsaturated-aliphatic, -alicyclic, and -aryl hydrocarbyl groups and saturated or unsaturated heteroaryl substituted hydrocarbyl groups.

6. The method of claim 1, wherein the one or more olefins are polymerized in the presence of a catalyst system comprising a chromocene dissolved or suspended in toluene or hexane, and the one or more olefins are polymerized in the presence of one or more alkyl aluminum compounds.

7. The method of claim 1, wherein the one or more olefins comprises an olefinic hydrocarbon having two to eight carbon atoms.

8. The method of claim 1, wherein the one or more olefins comprises ethylene.

9. The method of claim 1, wherein the one or more olefins comprises propylene.

10. The method of claim 1, wherein the one or more olefins comprises ethylene and either butene, hexene, octene, or a combination thereof.

11. The method of claim 1, wherein the one or more olefins are polymerized in the presence of a metallocene or Ziegler-Natta catalyst system.

12. A method for pretreating an interior wall of a polymerization reactor, comprising:
   locating one or more measurement surfaces within a polymerization system, the system comprising at least one reaction zone;
   polymerizing one or more monomers in the presence of a chromocene catalyst at conditions sufficient to deposit a polymer coating having a thickness greater than 5 mils on an interior wall of the reaction zone and the one or more measurement surfaces;
   measuring a rate of temperature change across the one or more measurement surfaces; and
   adjusting one or more reaction conditions within the system to obtain a desired polymer coating thickness within the reaction zone, the reaction conditions selected from the group consisting of temperature, pressure, olefin feed rate, olefin feed temperature, and chromocene feed rate.

13. The method of claim 12, wherein the chromocene catalyst is silyl chromate.

14. A method for olefin polymerization, comprising:
   polymerizing, in a gas phase reactor, one or more olefins at a first temperature in the presence of a catalyst system comprising one or more chromocene catalysts to provide a polymer coating therein;
   treating one or more process exposed surfaces prior to polymerizing with the catalyst system to reduce or eliminate polymer growth on the treated surface;
   creating a second temperature within the reactor,
   measuring a rate of temperature change from the first temperature to the second temperature;
   correlating the rate of temperature change to a thickness of the polymer coating deposited within the reactor; and
   upon reaching a desired coating thickness, polymerizing one or more olefins in the presence of a metallocene or Ziegler-Nan a catalyst system.

15. The method of claim 14, wherein treating comprises coating at least a portion of the one or more process exposed surfaces with a metal containing coating or passivating polymer.

16. The method of claim 14, wherein treating comprises applying a hydrocarbon-containing compound to at least a portion of the one or more process exposed surfaces to enable cohesive failure between the polymer coating and the treated surface, wherein the hydrocarbon-containing compound is non-volatile at the gas phase conditions.

17. The method of claim 16 wherein the hydrocarbon-containing compound consists essentially of a halogen substituted or a silicon-containing hydrocarbon.

18. The method of claim 14, wherein the second temperature is above or below the first temperature.

19. The method of claim 18, wherein the first and second temperatures differ by at least 10° C.

20. The method of claim 14, wherein creating a second temperature within the reactor comprises heating a thermally conductive device at least partially disposed in the reactor to a second temperature above the first temperature to create a temperature difference.

21. The method of claim 14, wherein the one or more olefins comprises an olefinic hydrocarbon having two to eight carbon atoms.

22. The method of claim 14, wherein the one or more olefins comprises ethylene and either butene, hexene, octene, or a combination thereof.

23. The method of claim 14, wherein the one or more chromocene catalysts are represented by the general structure:

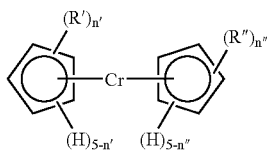

wherein R' and R" are each independently selected from the group consisting of $C_1$ to $C_{20}$ alkyl;
n' is an integer 0 to 5;
n" is an integer 0 to 5; and
R' and R" are each independently selected from the group consisting saturated or unsaturated-aliphatic, -alicyclic, and -aryl hydrocarbyl groups and saturated or unsaturated heteroaryl substituted hydrocarbyl groups.

24. A system for gas phase olefin polymerization, comprising:
  a gas phase reactor for polymerizing one or more olefins at a first temperature and pressure sufficient to deposit a polymer coating therein;
  one or more thermally conductive devices at least partially disposed within the reactor, each thermally conductive device comprising a measurement surface, power source and recorder;
  means for heating or cooling the measurement surface to a second temperature, wherein the second temperature is above or below the first temperature; and
  means for measuring a rate of temperature change of the measurement surface.

25. The system of claim 24, wherein the measurement surface is constructed of a metallic material the same as the reactor.

* * * * *